(12) United States Patent
Xu (10) Patent No.: US 12,196,319 B1
(45) Date of Patent: Jan. 14, 2025

(54) SOUP CUP FOR MAINTAINING HIGH SEALING PROPERTY

(71) Applicant: Dongguan Oumeng Houseware Products Co., Ltd, Dongguan (CN)

(72) Inventor: Jinsheng Xu, Dongguan (CN)

(73) Assignee: Dongguan Oumeng Houseware Products Co., Ltd, Dongguan (CN)

( * ) Notice: Subject to any disclaimer, the term of this patent is extended or adjusted under 35 U.S.C. 154(b) by 0 days.

(21) Appl. No.: 18/658,475

(22) Filed: May 8, 2024

(30) Foreign Application Priority Data

Mar. 12, 2024 (CN) .......................... 202420466511.1

(51) Int. Cl.
*A47J 41/00* (2006.01)
*F16J 15/3208* (2016.01)
*F16J 15/3284* (2016.01)

(52) U.S. Cl.
CPC ....... *F16J 15/3284* (2013.01); *A47J 41/0061* (2013.01); *F16J 15/3208* (2013.01)

(58) Field of Classification Search
CPC .... B65D 45/322; B65D 45/327; B65D 55/04; A47J 41/0061
See application file for complete search history.

(56) References Cited

U.S. PATENT DOCUMENTS

| 8,186,527 | B2 * | 5/2012 | Liu | B65D 39/12 215/354 |
| 9,452,871 | B1 * | 9/2016 | Ho | B65D 53/02 |
| 2011/0011862 | A1 * | 1/2011 | Matsumoto | B65D 45/327 220/234 |
| 2012/0199588 | A1 * | 8/2012 | Wheeler | B65D 41/0414 220/315 |
| 2014/0299569 | A1 * | 10/2014 | Van De Klippe | B65D 45/32 215/272 |
| 2020/0031544 | A1 * | 1/2020 | Choi | B65D 43/0231 |
| 2021/0269200 | A1 * | 9/2021 | Ou | B65D 51/242 |
| 2022/0127050 | A1 * | 4/2022 | Jin | B65D 39/16 |
| 2022/0371790 | A1 * | 11/2022 | Paxson | B65D 43/022 |
| 2023/0145765 | A1 * | 5/2023 | McNamara | B65D 55/10 215/340 |
| 2024/0140658 | A1 * | 5/2024 | Shao | B65D 45/327 |

FOREIGN PATENT DOCUMENTS

WO    WO-2020039336 A1 *   2/2020   ......... B65D 43/0231

* cited by examiner

*Primary Examiner* — Don M Anderson (57) ABSTRACT

The present disclosure relates to a soup cup for maintaining a high sealing property. The soup cup includes a cup body; a compartment; an upper cover; a vertical wall; and an oil seal spring. When the upper cover is clamped to the cup body, primary sealing of the soup in the cup body can be completed, and then the sealing rubber film at the bottom of the upper cover can perform secondary sealing on the cup body; and moreover, the oil seal spring is embedded inside the sealing rubber film, and the oil seal spring expands to achieve tertiary sealing, thereby effectively preventing unfirm attachment between the upper cover and the cup body from caused by excessively long time, eliminating heat loss and liquid overflow caused by existence of various gaps, maintaining a high heat retention effect, and simultaneously creating a desirable use feeling for a holder.

10 Claims, 9 Drawing Sheets

SOUP CUP FOR MAINTAINING HIGH SEALING PROPERTY

TECHNICAL FIELD

The present disclosure belongs to the technical field of soup cups, and particularly relates to a soup cup for maintaining a high sealing property.

BACKGROUND

A soup cup, as a traditional utensil for cooking and serving soup, has been widely used in daily life and food processing industry.

However, the traditional soup cup has defects in sealing property design. A cover and a cup body are simply engaged, which can extremely easily result in soup leakage during movement or storage of the soup cup, thereby affecting food taste and hygiene, and even causing safety hazards such as burns; and although the sealing design has been added into the existing soup cup, and plastic or rubber materials are usually used as materials for manufacturing the cover and a cover edge, the cover is prone to aging and deformation after high temperature or long-term use, thereby affecting a sealing effect. In view of this, a soup cup for maintaining a high sealing property is designed.

SUMMARY

An objective of the present disclosure is to provide a soup cup for maintaining a high sealing property, so as to solve the problem put forward in the background.

In order to achieve the above objective, the present disclosure provides the following technical solution: a soup cup for maintaining a high sealing property includes:
  a cup body;
  a compartment, where the at least one compartment configured to store soup is arranged in the cup body;
  an upper cover, where the upper cover configured to close the compartment is arranged on the cup body;
  a vertical wall, where a bottom of the upper cover is provided with the vertical wall extending inwards;
  a sealing rubber film, where the vertical wall defines a vertical mount configured to accommodate the sealing rubber film;
  an oil seal spring, where the oil seal spring is detachably mounted on an inner wall of the sealing rubber film;
  a sealing device arranged between the upper cover and the sealing rubber film and configured to control a state of the oil seal spring;
  a return device arranged between the sealing device and the upper cover and configured to push the sealing device to return; and
  a thermostatic device arranged in the cup body and configured to reduce heat transfer of the soup stored in the compartment.

Preferably, the soup cup further includes:
a pulling handle, where the pulling handle is embedded at a top of the upper cover; and
a pulling shaft, where the pulling handle is provided with the square pulling shaft configured to connect the pulling handle to the sealing device.

Preferably, the sealing device includes:
an assembly groove, where the assembly groove is provided in the upper cover, and the assembly groove is provided with an opening;
a connector, where the connector is slidably arranged in the opening; and
a pulling device, where the upper cover is connected to the connector by arranging the pulling device.

Preferably, the pulling device includes:
a downward pressing ring arranged at the bottom of the upper cover;
strip-shaped sliders, where the downward pressing ring is provided with the plurality of strip-shaped sliders extending outwards and is slidably connected to the opening by means of the strip-shaped sliders;
a connecting plate, where a bottom of the downward pressing ring is connected to the connector by means of the connecting plate; and
a bottom plate, where the bottom plate is arranged at a bottom of the connecting plate.

Preferably, an adjustment space a is formed between an outer wall of the downward pressing ring and the strip-shaped slider.

Preferably, an expansion ring is arranged downwards on an outer wall of the connecting plate, and an adjustment space b is formed between the expansion ring, the outer wall of the connecting plate and the sealing rubber film.

Preferably, the soup cup further includes:
a vent hole, where the vent hole is in communication between the connecting plate and the bottom plate.

Preferably, the return device includes:
elastic members, where the several elastic members are arranged and are all connected between a top of the connecting plate and the upper cover; and
lifting members symmetrically arranged at an outer side of the sealing rubber film and achieving auxiliary lifting and returning by means of a lifting groove provided on the upper cover.

Preferably, the thermostatic device includes:
a heat insulation cavity, where the heat insulation cavity is provided in a volume space between an inn wall and an outer wall of the cup body.

Preferably, the heat insulation cavity is filled with polystyrene.

Compared with the prior art, the present disclosure has the beneficial effects: when the upper cover is clamped to the cup body in the present disclosure, primary sealing of the soup in the cup body can be completed, and then the sealing rubber film at the bottom of the upper cover can perform secondary sealing on the cup body; and moreover, the oil seal spring is embedded inside the sealing rubber film, and the oil seal spring expands to drive the sealing rubber film to deform, so as to be closely attached to the inner wall of the cup body to achieve tertiary sealing. By means of multiple sealing, unfirmly attachment between the upper cover and the cup body caused by excessively long time is effectively prevented, heat loss and liquid overflow caused by existence of various gaps are eliminated, and a desirable use feeling is created for a holder while a high heat retention effect is maintained. Opening and closing of the oil seal spring and the pulling handle at the top of the upper cover are further controlled in a linkage manner, and then a user rotates the pulling handle to drive the downward pressing ring, the connecting plate and the bottom plate to move up and down such that the oil seal spring can be pressed to expand, so as to drive the sealing rubber film to deform to forcibly seal the cup body. The oil seal spring can further be easily restored by means of a compression spring between the connecting plate and the upper cover to match opening of the upper cover.

REFERENCE NUMERALS IN THE FIGURES

1—cup body;
2—compartment;
3—upper cover, 31—vertical wall, 32—sealing rubber film, and 33—oil seal spring;
301—pulling handle, and 302—pulling shaft;
4—sealing device, 41—assembly groove, 42—opening, and 43—connector;
44—pulling device, 441—downward pressing ring, 442—strip-shaped slider,
443—connecting plate, 444—bottom plate, 445—expansion ring, adjustment space a, and adjustment space b;
5—return device, 51—elastic member, 52—lifting member, and 521—lifting groove;
6—thermostatic device, and 601—heat insulation cavity; and
7—vent hole.

DETAILED DESCRIPTION OF THE EMBODIMENTS

The technical solutions in the examples of the present disclosure are clearly and completely described below in combination with the accompanying drawings in the examples of the present disclosure. Apparently, the examples described are only some examples rather than all examples of the present disclosure. All other examples obtained by those of ordinary skill in the art on the basis of the examples of the present disclosure without making creative efforts shall fall within the scope of protection of the present disclosure.

Example 1

Figure 1:
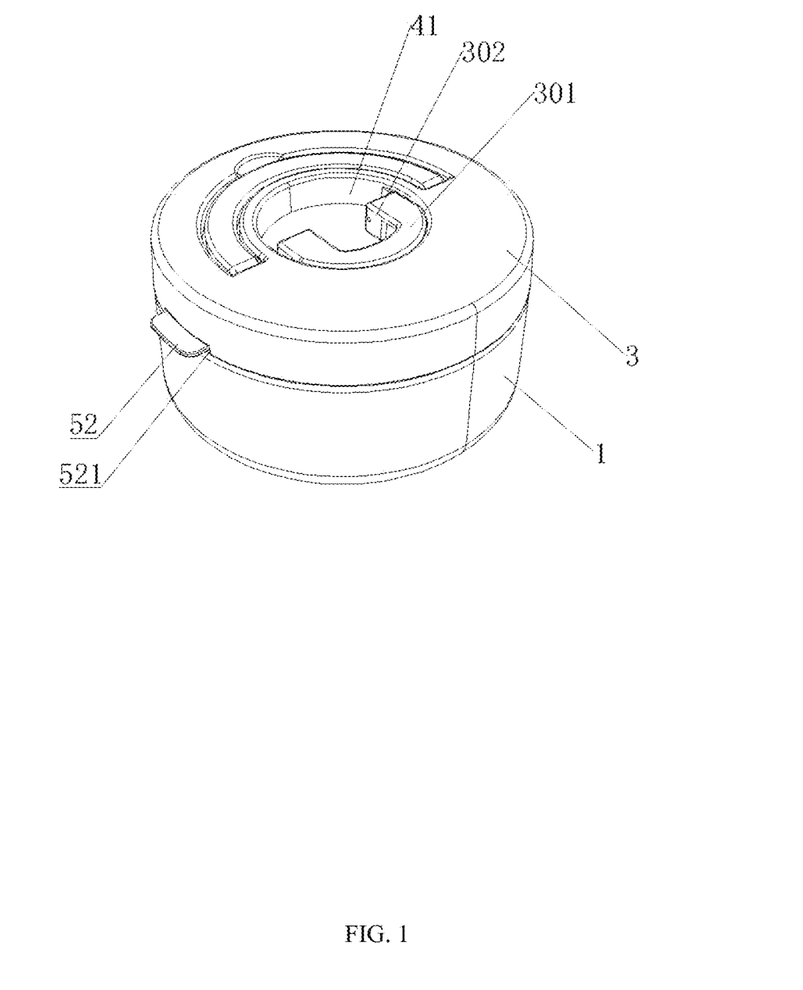
FIG. 1 is a schematic perspective structural diagram of the present disclosure.
Figure 2:
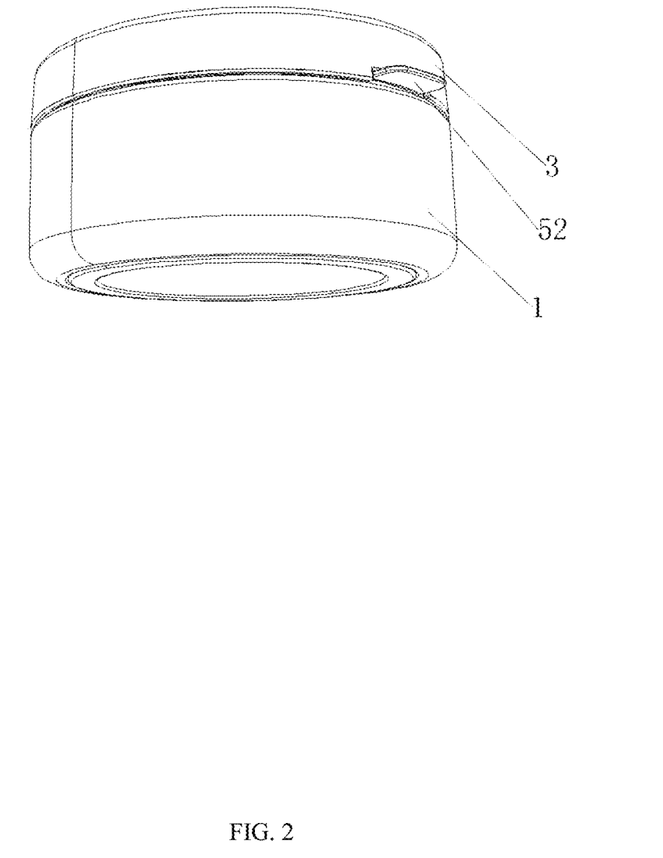
FIG. 2 is another perspective view of the present disclosure.
Figure 3:
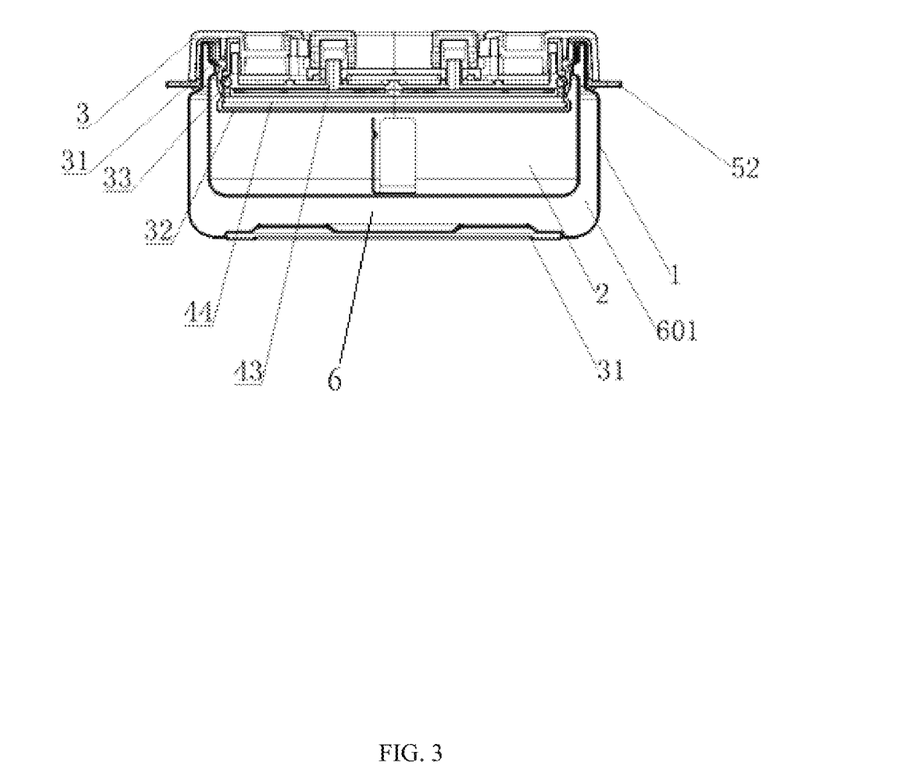
FIG. 3 is a sectional view of the present disclosure.
Figure 4:
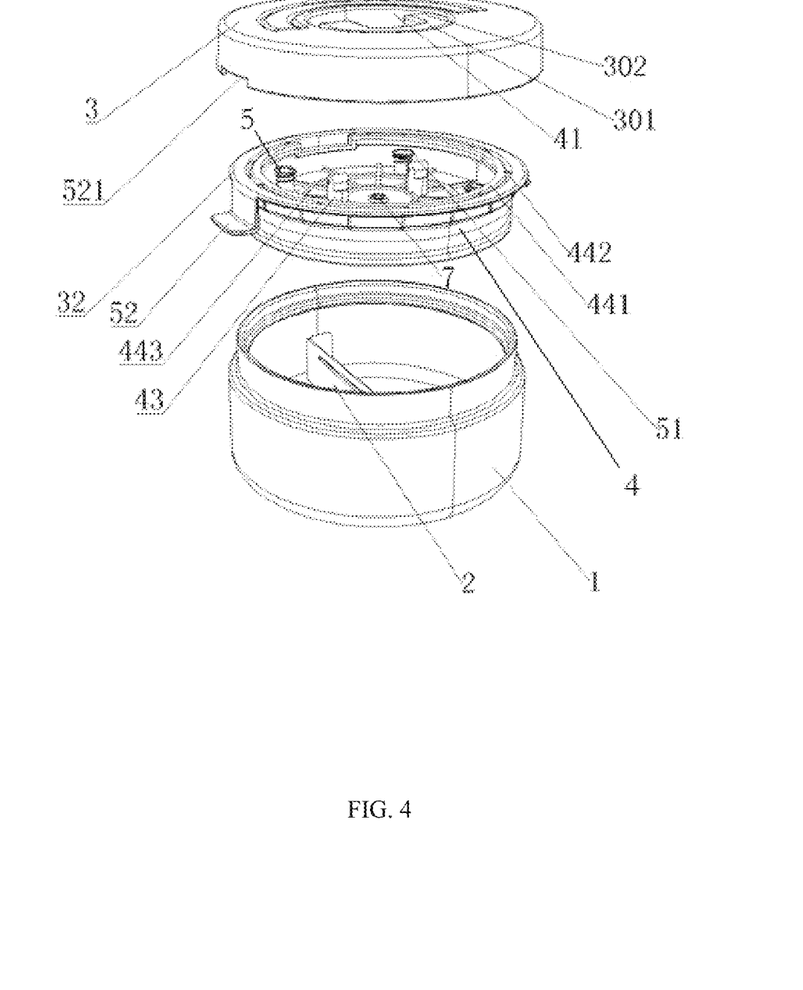
FIG. 4 is a first exploded view of the present disclosure.
Figure 5:
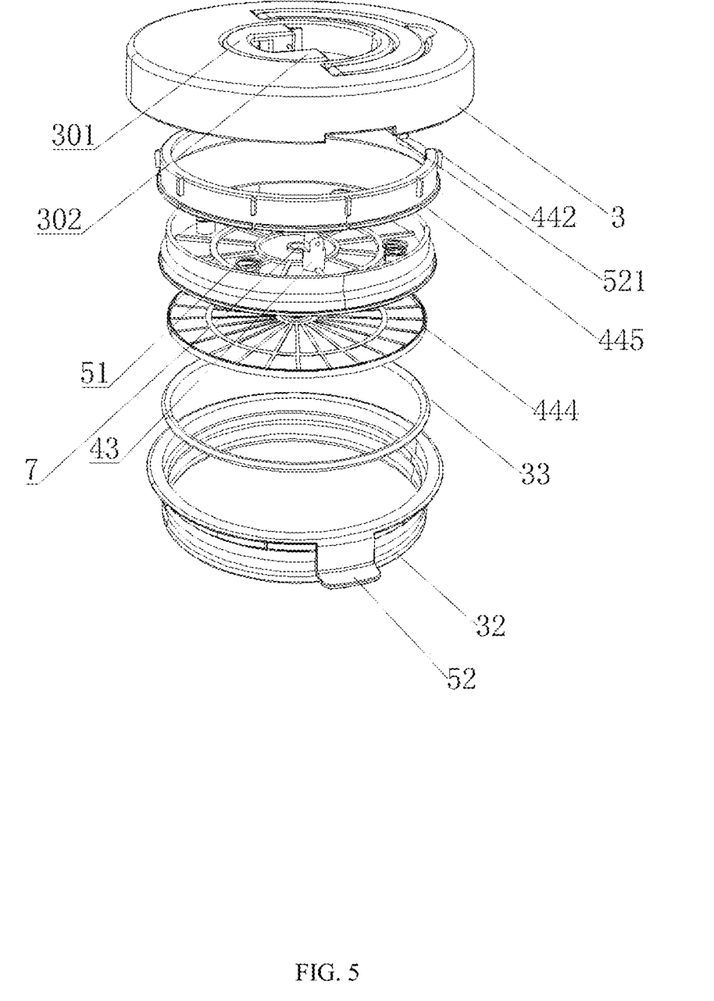
FIG. 5 is a second exploded view of the present disclosure.
Figure 6:
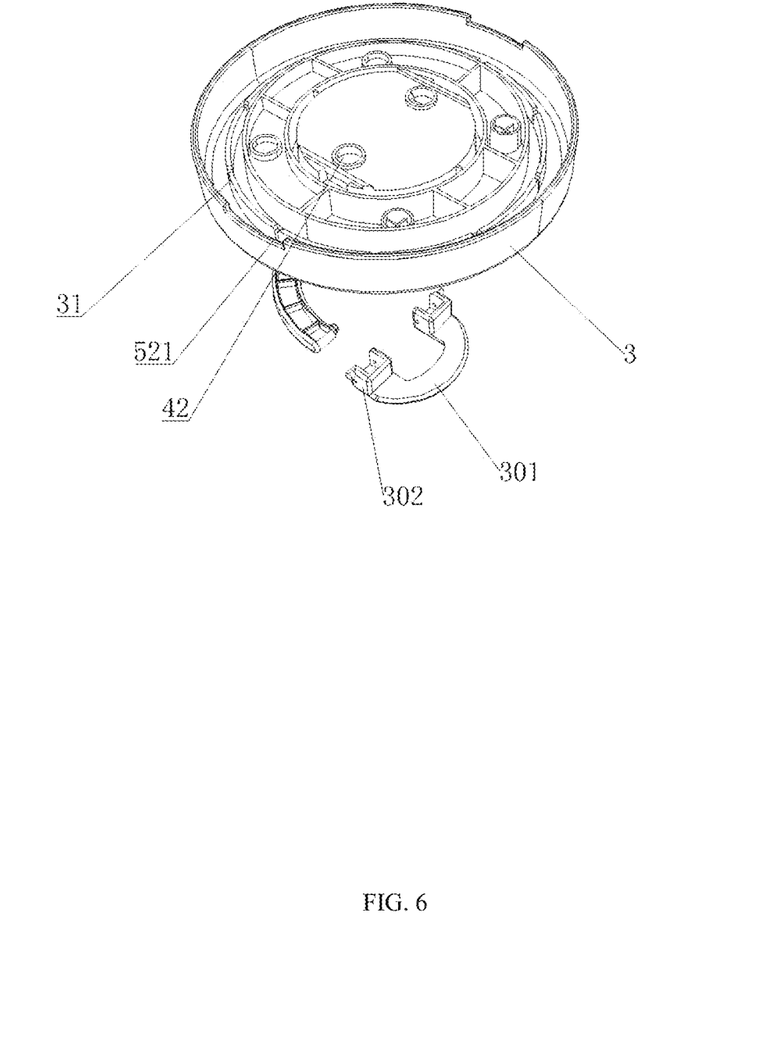
FIG. 6 is an exploded view of an upper cover in the present disclosure.
Figure 7:
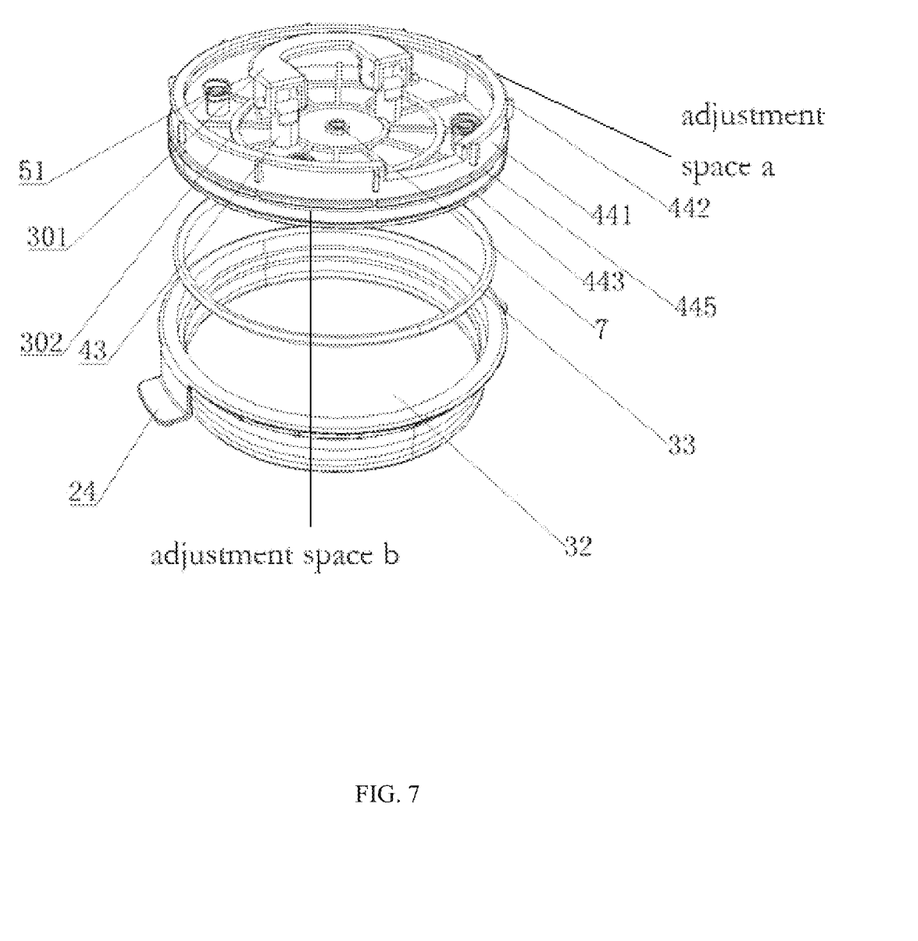
FIG. 7 is a third exploded view of the present disclosure.
Figure 8:
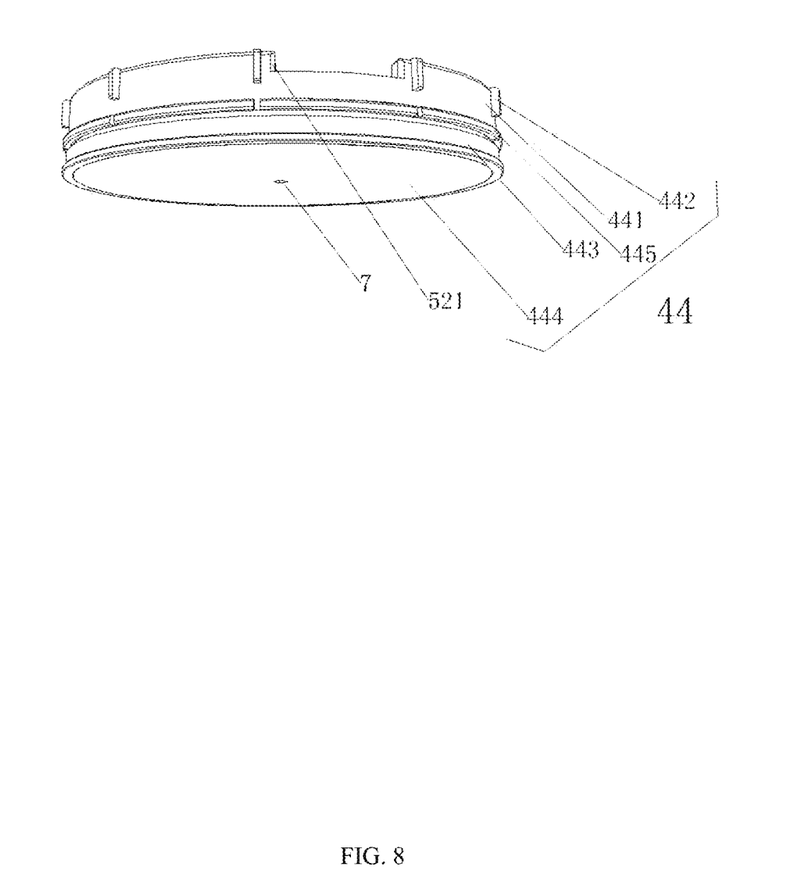
FIG. 8 is a schematic structural diagram of a pulling device in the present disclosure.
Figure 9:
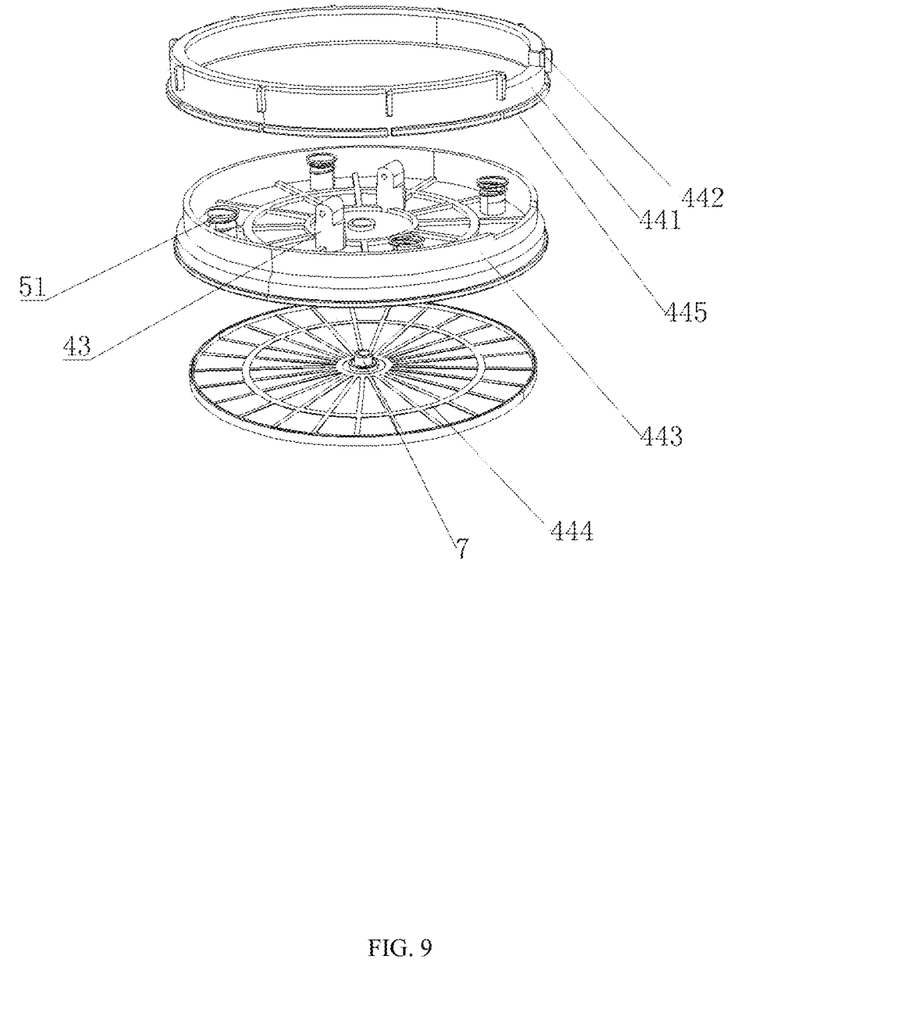
FIG. 9 is a fourth exploded view of the present disclosure.

A soup cup for maintaining a high sealing property as shown in FIGS. 1-9 includes a cup body 1, where the cup body 1 defining at least one compartment 2 configured to store soup in the cup body; the compartment 2 configured to store soup attached to an inner wall surface, formed on at least portion of the inner wall surface and configured to prevent contact between food stored in the compartment 2 and an outer wall surface of the cup body 1; an upper cover 3 configured to close the compartment 2 on the cup body 1, thereby substantially eliminating overflow and heat transfer generated after contact collision between the stored soup and an upper wall surface of the compartment 2, where a bottom of the upper cover 3 is provided with a vertical wall 31 extending inwards and having a substantially circular shape, and the vertical wall 31 defines a vertical mount configured to accommodate a sealing rubber film 32 made of soft plastic; and the sealing rubber film 32 is provided with an open top; and an oil seal spring 33 configured to change a state of the oil seal spring on the sealing rubber film 32, where the oil seal spring 33 is detachably mounted on an inner wall of the sealing rubber film 32. The soup cup further includes a sealing device 4 arranged between the upper cover 3 and the sealing rubber film 32 and configured to drive the oil seal spring 33 to change in the cup body 1, so as to form a sealed state in the compartment 2; a return device 5 arranged between the sealing device 4 and the upper cover 3 and configured to quickly restore the state of the upper cover 3 and unlock forced sealing of the cup body 1 after the sealing device 4 stops an operation; and a thermostatic device 6 configured to control the temperature of the soup stored in the cup body 1, thereby basically eliminating the influence of external air on internal heat.

The soup cup further includes a pulling handle 301 embedded at a top of the upper cover 3, where the pulling handle 301 is configured to extract air in operative engagement when the sealing rubber film 32 operates in the upper cover 3; and the pulling handle 301 is provided with a square pulling shaft 302 configured to connect the pulling handle 301 to the sealing device 4.

The sealing device 4 includes an assembly groove 41 in the upper cover 3, where the assembly groove 41 is provided with an opening 42, a pulling device 44 in the upper cover 3 is connected to a connector 43 of the opening 42, and is configured to provide linkage connection between the opening 42 and an interior of the upper cover 3, and the pulling shaft 302 on the pulling handle 301 is connected to one end of the opening 42 opposite the connector 43; and the pulling device 44, where the pulling device 44 is located below the opening 42 of a through hole and is configured to drive the oil seal spring 33 to expand in the compartment 2 and prevent air from entering the cup body 1 by means of an outer wall surface of the sealing rubber film 32 anew.

The pulling device 44 includes a downward pressing ring 441 at the bottom of the upper cover 3, where the downward pressing ring 441 is provided with a plurality of strip-shaped sliders 442 extending outwards from the vertical wall 31, and the strip-shaped sliders 442 are slidably connected to the openings 42 at the bottom of the upper cover 3, and are configured to drive the downward pressing ring 441 to vertically lift during operation; and the downward pressing ring 441 is provided with an open top and bottom; and the bottom of the downward pressing ring 441 is configured to be connected to a connecting plate 443 of the connector 43, thereby connecting the pulling device 44 to the pulling handle 301; and a bottom plate 444 configured to balance an air pressure on an inner wall of the upper cover 3 at a bottom of the connecting plate 443, where the bottom plate 444 makes contact with an inner wall of the sealing rubber film 32, and a vent hole 7 is in communication between the bottom plate 444 and the connecting plate 443.

A circumferential laterally interrupted substantially strip-shaped structure is formed on an outer wall surface of the downward pressing ring 441, and is configured to form an adjustment space a between an outer wall of the downward pressing ring 441 and the slider.

An outer wall of the connecting plate 443 extends downwards to form an expansion ring 445 configured to form an adjustment space b between the outer wall of the connecting plate 443 and the sealing rubber film 32.

The soup cup further includes a return device 5 arranged between a top of the connecting plate 443 in the pulling device 44 and the upper cover 3. After the pulling device 44 moves upwards to block air, the air pressure inside the compartment 2 is reduced along with extension of storage time of the soup to form a strong adsorption force, and the return device 5 may push the connecting plate 443 to quickly restore an original state inside when the upper cover 3 is opened.

The return device 5 includes elastic members 51 connected between the top of the connecting plate 443 and the upper cover 3, and operatively engaged on the connecting plate 443 when the upper cover 3 is releasably fixed to an inner surface of the upper cover 3; and lifting members 52 symmetrically arranged at an outer side of the sealing rubber film 32, where the lifting members 52 achieves auxiliary pulling and returning by means of a lifting groove 521 provided on the upper cover 3.

The soup cup further includes a heat insulation cavity 601 provided between an inner wall and an outer wall of the cup body 1, which is a partial volume space existing in the cup body 1. The heat insulation cavity 601 may be filled with polystyrene to avoid excessive increase in the weight of the cup body 1 and avoid direct contact with air, so as to maintain an internal temperature change of the cavity within a controllable range.

Example 2

A soup cup for maintaining a high sealing property as shown in FIGS. 1-9 is a utensil for holding soup. According to selection of different materials of the soup cup, the soup cup functions as heat insulation and heat retention to some extent, and includes a cup body 1 and an upper cover 3. A top of the cup body 1 extends to be provided with a protruding ring, and the protruding ring has a diameter less than an inner wall diameter of the cup body 1, is configured to support clamping to the upper cover 3, has an effect of shielding and sealing soup in the cup body 1, has an effect of preventing external air and improving internal temperature increase efficiency during cooking, and moreover, can further prevent dust from entering the cup body 1 to protect the soup in the cup body 1, so as to ensure edible taste and sanitary requirements of the soup.

A partition plate is mounted at an inner bottom of the cup body 1, is detachable for use, and may define at least one compartment 2 configured to store soup in the partition plate, so as to prevent contact between food stored in the cup body 1 and an outer wall surface of the cup body 1, thereby substantially eliminating overflow and heat transfer generated after contact collision between the stored soup and an upper wall surface of the compartment 2. Moreover, the design of the partition plate can place different kinds of food separately, thereby avoiding taste deterioration caused by food mixing, and further preventing peculiar smell of the food from being transmitted to each other, maintains original taste of the food, and is suitable for carrying scenes of different foods, thereby improving practicability of the soup cup.

A certain volume of space exists between an inner wall and an outer wall of the cup body 1, which is a heat insulation cavity 601. The heat insulation cavity is filled with polystyrene and other materials having strong heat insulation and light weight to insulate heat transmitted from an interior of the cup body 1, thereby maintaining an outer wall of the cup body 1 at a low temperature advantageously, and preventing a user from feeling overheating or discomfort when touching the outer wall. Furthermore, the design of the heat insulation cavity 601 may further effectively isolate an external environment, and reduce the influence of an external temperature on an internal temperature of the cup body 1 and heat loss of the soup, thereby improving a heat retention effect, and providing a longer time for hot food or beverage temperature maintenance.

Moreover, a heat insulation anti-skid pad is fixedly mounted at that bottom of the cup body 1, and is mostly made of a plastic material, and has an effective anti-skid effect by means of a strong friction force when plastic makes contact with a desktop, thereby preventing the cup body 1 from accidentally dumping or sliding during sliding or moving on the desktop or other planes, preventing the soup from being carelessly spilled, and reducing potential safety hazards and scalding events. Moreover, the heat insulation anti-skid pad may further serve as a buffer layer to reduce friction between the bottom of the cup body 1 and a hard surface, protect the bottom of the cup body 1 from damage or abrasion, and effectively prolong service life of the cup body 1. Moreover, the existence of the heat insulation anti-skid pad may further isolate heat conduction at the bottom of the cup body 1 to some extent, further reduce heat loss of the soup inside the cup body 1, and maintain a high heat retention effect.

Example 3

A soup cup for maintaining a high sealing property as shown in FIGS. 1-9 includes a cup body 1 and an upper cover 3. The upper cover 3 is clamped to a protruding ring to cover the cup body 1, so as to shield and seal soup in the cup body 1, prevent external air, has an effect of preventing external air and improving internal temperature increase efficiency during cooking, and moreover, can further prevent dust from entering the cup body 1 to protect the soup in the cup body 1, so as to ensure edible taste and sanitary requirements of the soup.

A bottom of the upper cover 3 is provided with a vertical wall 31 extending inwards and having a substantially circular shape, the vertical wall 31 defines a vertical mount configured to accommodate a sealing rubber film 32 made of soft plastic, the sealing rubber film 32 is fixedly mounted in the vertical wall 31, and the sealing rubber film 32 is made of food-grade thermoplastic vulcanizate (TPV) sealing plastic material. Compared with a common silicone sealing ring, the sealing rubber film not only has a better sealing property and aging resistance, but also has desirable high temperature resistance and an excellent regeneration property, and has a relatively longer service life without replacement for a long time. The sealing rubber film 32 wraps all components at the bottom of the upper cover 3 to avoid unnecessary food infection caused by direct contact between the components and soup, and the components are also damaged after direct contact, thereby greatly reducing service life.

When the upper cover 3 is clamped to the cup body 1, the sealing rubber film 32 is driven to be integrally attached to the inner wall of the cup body 1, so as to seal and retain heat of the soup inside the cup body 1. In order to further improve a sealing effect, a sealing ring is further arranged at a periphery of the sealing rubber film 32 in an extending manner, and the sealing ring is made of the same material as the sealing rubber film 32. After the upper cover 3 is clamped to the cup body 1, the sealing ring is closely attached to the top of the protruding ring, so as to prevent heat loss caused by a peripheral gap and a poor heat retention effect.

Example 4

On the basis of Example 3, the sealing rubber film 32 is provided with an open top, an oil seal spring 33 configured to change a state of the oil seal spring is arranged on the sealing rubber film 32, and the oil seal spring 33 is detachably mounted on an inner wall of the sealing rubber film 32.

The oil seal spring 33 is an annular tightening spring used in a sealing member, has an expansion length ranging from 20 mm to 5000 mm, is usually formed by winding high-quality carbon steel or stainless steel wire having a wire diameter ranging from 0.15 mm to 1.0 mm, has a function of clamping an oil seal on a shaft, has a better sealing property, is generally used in the oil seal of a shock absorber or a rotary oil seal, can strengthen a radial force, and can further have an effect of compensation. When the oil seal spring 33 is used in the example, the oil seal spring 33 may be embedded in the sealing rubber film 32. When the oil seal spring 33 is expanded, the sealing rubber film 32 may be driven to deform outwards to more closely attached to the inner wall of the cup body 1, so as to strengthen sealing of the cup body 1 and retain heat of the soup in the cup bod to prevent heat loss and leakage.

Example 5

As described in Example 4, after the oil seal spring 33 is embedded in the sealing rubber film 32, the sealing rubber film 32 may be driven to deform outwards to be closely attached to the inner wall of the cup body 1 by expanding the oil seal spring 33, so as to strengthen sealing of the cup body 1, retain heat of the soup inside the cup body, and prevent heat loss and leakage. In order to achieve easy expansion of the oil seal spring 33, a structure capable of controlling expansion and return of the oil seal spring 33 is further arranged, which is shown as follows:

An insertion groove is provided at the bottom of the upper cover 3 located at an inner side of the vertical wall 31, and is configured to movably mount the downward pressing ring 441, and a bottom plate 444 is fixedly mounted at a bottom of the downward pressing ring 441 by means of a connecting plate 443. That is, the downward pressing ring 441, the connecting plate 443 and the bottom plate 444 are all located in the sealing rubber film 32. In an initial state, the oil seal spring 33 is located between the sealing rubber film 32 and the downward pressing ring 441 (the oil seal spring 33 sleeves an outer side of the downward pressure ring 441). When a diameter of the connecting plate 443 is greater than that of the downward pressing ring 441, the downward pressing ring 441, the connecting plate 443 and the bottom plate 444 may be driven to move upwards. When upward movement of the connecting plate 443 abuts against outward expansion of the oil seal spring 33 until the oil seal spring 33 sleeves an outer side of the connecting plate 443, the oil seal spring 33 maintains an expanded state to abut against deformation of the sealing rubber film 32 to be closely attached to the inner wall of the cup body 1, so as to achieve a higher sealing effect.

Secondly, the oil seal spring 33 may not always maintain a horizontal state during upward and downward movement of the downward pressing ring 441, the connecting plate 443, and the bottom plate 444. When the oil seal spring 33 deviates from the downward pressing ring 441 and the connecting plate 443, a diameter of a pressing range of the oil seal spring 33 becomes large, and the oil seal spring may not expand effectively. Moreover, the oil seal spring 33 fails, and needs disassembly and maintenance, which is extremely troublesome. Therefore, strip-shaped sliders 442 are arranged on the outer side of the downward pressing ring 441 in an extending manner, and is configured to transform movable connection between the downward pressing ring 441 and the insertion groove of the upper cover 3 into vertical sliding connection, so as to avoid a radial influence of movement of the downward pressing ring 441 on the expansion state of the oil seal spring 33. Moreover, the strip-shaped sliders 442 are just located at a joint of the downward pressing ring 441 and the connecting plate 443, and has the same diameter as the connecting plate 443, thereby reducing an expansion frequency of the oil seal spring 33, further reducing abrasion of the oil seal spring 33, and prolonging service life of the oil seal spring.

Moreover, the outer wall of the connecting plate 443 of the downward pressing ring 441 extends downwards to form an expansion ring 445 configured to form an adjustment space b between the outer wall of the connecting plate 443 and the sealing rubber film 32. When the connecting plate 443 moves upwards, the oil seal spring 33 makes contact with the strip-shaped slider 442 and then may expand, so as to achieve an expected effect. During the period, the oil seal spring 33 is limited in the adjustment space b to maintain horizontal expansion, thereby ensuring a sealing effect. Correspondingly, an adjustment space a is formed between the strip-shaped slider 442 and a periphery of the connecting plate 443. When sealing needs to be released, the downward pressing ring 441, the connecting plate 443 and the bottom plate 444 are driven to move downwards to return, such that the oil seal spring 33 in a return space a may be driven to expand anew, and then the oil seal spring retracts and sleeves the downward pressing ring 441, such that the sealing rubber film 32 returns to a normal state to match opening of the upper cover 3.

An adjustment space a is formed between the strip-shaped slider 442 and the periphery of the connecting plate 443. When the connecting plate 443 moves upwards, the oil seal spring 33 makes contact with the strip-shaped slider 442 and may expand, so as to achieve an expected effect. During the period, the oil seal spring 33 is limited in the adjustment space a to maintain horizontal expansion, thereby ensuring a sealing effect. Correspondingly, the outer wall of the connecting plate 443 of the downward pressing ring 441 further extends outwards to form the expansion ring 445 configured to form an adjustment space b between the outer wall of the connecting plate 443 and the sealing rubber film 32. When sealing needs to be released, the downward pressing ring 441, the connecting plate 44312 and the bottom plate 444 are driven to move downwards to return, such that the oil seal spring 33 in the return space a may be driven to expand anew, and then the oil seal spring retracts and sleeves the downward pressing ring 441, such that the sealant film 32 returns to a normal state to match opening of the upper cover 3.

Example 6

According to a soup cup for maintaining a high sealing property as shown in FIGS. 1-9, an oil seal spring 33 may be controlled by driving a downward pressing ring 441, a connecting plate 443 and a bottom plate 444 at a bottom of an upper cover 3 to move up and down, so as to drive the sealing rubber film 32 to deform to seal and retain heat of soup inside a cup body 1. However, the downward pressing ring 441, the connecting plate 443 and the bottom plate 444 are all located between the sealing rubber film 32 and the upper cover 3, and the downward pressing ring 441, the connecting plate 443 and the bottom plate 444 may not move directly. Thus, a pulling device 44 is designed at a top of the upper cover 3, and is configured to indirectly drive the downward pressing ring 441, the connecting plate 443 and the bottom plate 444 to move, so as to seal the cup body 1.

An assembly groove 41 is embedded at a top of the upper cover 3, and the assembly groove 41 is circular and has a diameter half of a diameter of the upper cover 3. Square holes are symmetrically provided on an inner wall of the assembly groove 41 in a bilateral symmetry manner, and a pulling handle 301 is rotatably arranged in the square holes, and is configured to connect a sealing device 4 when the sealing rubber film 32 operates in the upper cover 3, so as to extract air inside the sealing device, thereby achieving a sealing effect. Furthermore, the pulling handle 301 is provided with a square pulling shaft 302 configured to connect the pulling handle 301 to the sealing device 4. The specific shape of the pulling shaft 302 is a hollow square, but the pulling handle 301 is semicircular and has a diameter the same as the diameter of the assembly groove 41. That is, the pulling handle 301 may be perfectly embedded into the assembly groove 41 after rotating 900 leftwards, which is simple and aesthetic without influencing remaining operations.

When the pulling shaft 302 and the pulling handle 301 are perpendicular to the upper cover 3 in an initial state, two rotating holes are provided at a position below the pulling shaft 302, a connector 43 is rotatably connected between the rotating holes, and two openings 42 are provided on the assembly groove 41 located at a position below the pulling shaft 302, and the connector 43 may slide in the openings 42. Specifically, when the pulling shaft 302 and the pulling handle 301 are in a relaxed state, the rotating hole is located at a low horizontal position. When the pulling handle 301 is pushed to rotate leftwards to withdraw the assembly groove 41, the rotating hole also rotates leftwards until the rotating hole is at a middle and high horizontal position. That is, the rotating hole drives the connector 43 to move upwards in the opening 42. When the pulling handle 301 is rotated anew to open, the connector 43 moves downwards in the opening 42.

It is concluded that the sealing device 4 connects a movement state of the downward pressing ring 441, the connecting plate 443 and the bottom plate 444 to the connector 43. That is, when a bottom of the connector 43 is connected to the connecting plate 443, the connector 43 may be driven to move upwards by rotating the pulling handle 301, the connecting plate 443 is further driven to move upwards, and the downward pressing ring 441, the connecting plate 443 and the bottom plate 444 are further driven to move upwards. In this case, the oil seal spring 33 is pressed into an adjustment space b to maintain an expanded state to drive the sealing rubber film 32 to be closely attached to the cup body 1, so as to complete sealing, and vice versa.

Example 7

According to a soup cup for maintaining a high sealing property as shown in FIGS. 1-9, a cup body 1 is covered with an upper cover 3, the cup body 1 is sealed in a contact manner by means of a sealing rubber film 32 and a sealing ring, and then a pulling handle 301 on the upper cover 3 is rotated to drive the sealing rubber film 32 to deform and expand, so as to be closely attached to an inner wall of the cup body 1 to achieve pressure sealing, and a combination of the sealing rubber film, the sealing ring and the pulling handle may strengthen sealing of the cup body 1, retain heat of soup inside the cup body, and prevent overflow and heat loss and leakage of soup. However, the temperature of the soup inside the cup body is gradually reduced along with extension of storage time, such that an air pressure inside the cup body 1 is reduced. Air pressures inside and outside the cup body 1 are not balanced, such that the upper cover 3 is difficult to open. Therefore, lifting members 52 are symmetrically arranged at an outer side of the sealing rubber film 32 in an extending manner. The lifting members 52 are also made of rubber. The upper cover 3 is conveniently opened by means of arrangement of the lifting members 52. The lifting members 52 only needs to be lifted upwards to drive the upper cover 3 to be slowly separated from the cup body 1. Symmetrical arrangement also makes the stress of the upper cover 3 more balanced, such that the phenomenon that the cup body 1 dumps and scalds others since the upper cover 3 is driven to deviate by a unilateral pulling force is prevented.

Correspondingly, an outer side of a bottom of the upper cover 3 is symmetrically provided with lifting grooves 521, and the lifting grooves 521 and the lifting members 52 are located vertically and horizontally, and are embedded with each other in a size, such that the lifting members 52 may be driven to open a larger area on the upper cover 3 by means of the lifting grooves 521, and manual grasping is facilitated to perform a subsequent action of lifting the upper cover 3.

Moreover, since the connecting plate 443 and the bottom plate 444 are components closest to an inner bottom of the sealing rubber film 32, the connecting plate 443 and the bottom plate 444 continuously rise and fall to press air between the connecting plate, the bottom plate and the inner bottom of the sealing rubber film 32 during continuous expansion and compression of the sealing rubber film 32. If the part of air may not circulate, an air pressure at the bottom of the sealing rubber film 32 is increasingly small, and lifting work becomes difficult due to resistance. Therefore, a vent hole 7 is in communication between the bottom plate 444 and the connecting plate 443, and air at the bottom of the sealing rubber film 32 may circulate by means of the vent hole 7, so as to maintain air pressure balance in the upper cover 3 and facilitate operation of the pulling handle 301.

In order to cooperate with faster opening of the upper cover 3, i.e. faster resetting of the downward pressing ring 441 and the following parts (the connecting plate 443 and the bottom plate 444), the relationship between the upper cover 3 and the connecting plate 443 is also extended to a sliding connection through the elastic member 51. A plurality of clamping grooves are provided at the bottom of the upper cover 3 and the top of the connecting plate 443, and are evenly distributed around a center of the upper cover 3. The upper and lower clamping grooves has the same number, and are located on the same vertical line separately, such that an elastic member 51 may be linearly connected between the clamping grooves. The elastic member 51 may be a common compression spring, and is usually configured to store energy and provide a reaction force. Compared with an ordinary spring, the elastic member has less abrasion when subjected to a compression force. Therefore, service life is longer.

That is, in an initial state, the elastic member 51 is connected between the upper cover 3 and the connecting plate 443. When the pulling handle 301 is rotated to drive the connecting plate 443 to move upwards, so as to press the sealing rubber film 32 to deform to be closely attached to the cup body 1, the elastic member 51 is shortened under the action of an applied load and starts to store energy. When the upper cover 3 needs to be opened, the pulling handle 301 rotates to return, and the connecting plate 443 is no longer subjected to an upward pulling force. In this case, the elastic member 51 starts to return and extend, and provides a reaction force to drive the connecting plate 443, the bottom plate 444 and the downward pressing ring 441 to move downwards together. The connecting plate 443 moves downwards to drive the oil seal spring 33 to return via a strip-shaped slider 442 and embeds the oil seal spring into the adjustment space a anew. That is, the sealing rubber film 32 accelerates separation from the cup body 1, such that the upper cover 3 is opened more quickly and returns, thereby improving use feeling.

Example 8

According to a soup cup for maintaining a high sealing property as shown in FIGS. 1-9, in order to convenient movement during sealing, a half-arc groove is further provided at a top of an upper cover 3. The half-arc groove is specifically in a shape of half-circle line extension, and a handle is movable mounted between positions at two ends of the half-arc groove. The handle is configured to lift the soup cup. When not in use, the handle may be rotated to store the handle in the half-arc groove. Thus, use in various application scenarios is convenient. Moreover, a left side of the half-arc groove extends upwards to be provided with a recess, the recess is a smooth and concave oval shape, and a user pulls up the handle through a single finger. Thus, operation is convenient.

It should be noted that relational terms herein such as first and second are only used to distinguish one entity or operation from another entity or operation without necessarily requiring or implying any actual such relation or order between such entities or operations. Moreover, terms "comprise", "include", "contain", or any other variations thereof are intended to cover non-exclusive inclusions, such that a process, a method, an article, or an apparatus including a series of elements not only includes those elements, but also includes other elements that are not explicitly listed, or further includes inherent elements of the process, the method, the article, or the apparatus. Without more restrictions, the elements defined by the sentence "comprise a . . . " and "include a . . . " do not exclude the existence of other identical elements in the process, the method, the article, or the apparatus including the elements.

What are described above are merely intended for description of the technical solutions of the present disclosure rather than limitations of the present disclosure, and other modifications or equivalent replacements made by those of ordinary skill in the art to the technical solutions of the present disclosure without departing from the spirit and scope of the technical solutions of the present disclosure should all fall within the scope of the claims of the present disclosure.

What is claimed is:

1. A soup cup for maintaining a high sealing property, comprising:
    a cup body;
    a compartment, wherein the compartment configured to store soup is arranged in the cup body;
    an upper cover, wherein the upper cover is configured to close the compartment and is arranged on the cup body;
    a vertical wall, wherein a bottom of the upper cover is provided with the vertical wall extending inwards;
    a sealing rubber film, wherein the vertical wall defines a vertical mount configured to accommodate the sealing rubber film;
    an oil seal spring, wherein the oil seal spring is detachably mounted on an inner wall of the sealing rubber film;
    a sealing device arranged between the upper cover and the sealing rubber film and configured to control a state of the oil seal spring;
    a return device arranged between the sealing device and the upper cover and configured to push the sealing device to return by opening of the upper cover; and
    a thermostatic device arranged in the cup body and configured to reduce heat transfer of the soup stored in the compartment.

2. The soup cup for maintaining a high sealing property according to claim 1, further comprising:
    a pulling handle, wherein the pulling handle is embedded at a top of the upper cover; and
    a square pulling shaft, wherein the pulling handle is provided with the square pulling shaft configured to connect the pulling handle to the sealing device.

3. The soup cup for maintaining a high sealing property according to claim 2, wherein the sealing device comprises:
    an assembly groove, wherein the assembly groove is provided in the upper cover, and the assembly groove is provided with an opening;
    a connector, wherein the connector is slidably arranged in the opening; and
    a pulling device, wherein the upper cover is connected to the connector by arranging the pulling device.

4. The soup cup for maintaining a high sealing property according to claim 3, wherein the pulling device comprises:
    a downward pressing ring arranged at the bottom of the upper cover;
    strip-shaped sliders, wherein the downward pressing ring is provided with the plurality of strip-shaped sliders extending outwards and is slidably connected to the opening by means of the strip-shaped sliders;
    a connecting plate, wherein a bottom of the downward pressing ring is connected to the connector by means of the connecting plate; and
    a bottom plate, wherein the bottom plate is arranged at a bottom of the connecting plate.

5. The soup cup for maintaining a high sealing property according to claim 4, wherein an adjustment space (a) is formed between an outer wall of the downward pressing ring and the strip-shaped slider.

6. The soup cup for maintaining a high sealing property according to claim 4, wherein an expansion ring is arranged downwards on an outer wall of the connecting plate, and an adjustment space (b) is formed between the expansion ring, the outer wall of the connecting plate and the sealing rubber film.

7. The soup cup for maintaining a high sealing property according to claim 4, further comprising:
    a vent hole, wherein the vent hole is in communication between the connecting plate and the bottom plate.

8. The soup cup for maintaining a high sealing property according to claim 1, wherein the return device comprises:
    elastic members, wherein the several elastic members are arranged and are all connected between a top of the connecting plate and the upper cover; and
    lifting members symmetrically arranged at an outer side of the sealing rubber film and achieving auxiliary lifting and returning by means of a lifting groove provided on the upper cover.

9. The soup cup for maintaining a high sealing property according to claim 1, wherein the thermostatic device comprises:
    a heat insulation cavity, wherein the heat insulation cavity is provided in a volume space between an inner wall and an outer wall of the cup body.

10. The soup cup for maintaining a high sealing property according to claim 9, wherein the heat insulation cavity is filled with polystyrene.

\* \* \* \* \*